(12) United States Patent
Nakane

(10) Patent No.: US 8,102,139 B2
(45) Date of Patent: Jan. 24, 2012

(54) INDICATING INSTRUMENT FOR VEHICLE

(75) Inventor: Hideyuki Nakane, Nishio (JP)

(73) Assignee: Denso Corporation, Kariya (JP)

( * ) Notice: Subject to any disclaimer, the term of this patent is extended or adjusted under 35 U.S.C. 154(b) by 150 days.

(21) Appl. No.: 12/658,144

(22) Filed: Feb. 3, 2010

(65) Prior Publication Data

US 2010/0192835 A1  Aug. 5, 2010

(30) Foreign Application Priority Data

Feb. 5, 2009  (JP) .................................. 2009-025215

(51) Int. Cl.
*H02P 8/00*  (2006.01)
*H02K 37/12*  (2006.01)
*G01R 1/20*  (2006.01)

(52) U.S. Cl. ........ 318/685; 318/696; 318/463; 116/62.1; 116/288; 324/163; 324/166; 702/114; 702/96; 73/1.37; 73/1.88

(58) Field of Classification Search .................. 318/599, 318/685, 696, 603, 463; 116/62.1, 47, 284–288, 116/297, DIG. 6, DIG. 35, DIG. 36; 324/139, 324/143, 144, 151 R, 163, 166; 702/142, 702/145, 96; 73/1.37, 1.88, 488
See application file for complete search history.

(56) References Cited

U.S. PATENT DOCUMENTS

| | | | | |
|---|---|---|---|---|
| 3,667,042 A * | 5/1972 | Engel et al. | ..... | 324/174 |
| 4,878,453 A * | 11/1989 | Inoue et al. | ..... | 116/288 |
| 5,032,781 A * | 7/1991 | Kronenberg | ..... | 318/696 |
| 5,353,735 A * | 10/1994 | Arai et al. | ..... | 116/286 |
| 5,723,964 A * | 3/1998 | Nakaba | ..... | 318/599 |
| 5,877,694 A * | 3/1999 | Kataoka | ..... | 340/688 |
| 6,014,075 A * | 1/2000 | Fujimori et al. | ..... | 340/461 |
| 6,067,492 A * | 5/2000 | Tabata et al. | ..... | 701/51 |
| 6,302,551 B1 * | 10/2001 | Matumoto | ..... | 362/27 |
| 6,520,108 B1 * | 2/2003 | Komura | ..... | 116/284 |
| 6,624,608 B2 | 9/2003 | Komura | | |
| 6,940,269 B2 * | 9/2005 | Komura | ..... | 324/146 |
| 6,956,351 B2 * | 10/2005 | Yamada | ..... | 318/685 |
| 7,034,495 B2 * | 4/2006 | Sasaki | ..... | 318/685 |
| 7,075,290 B2 * | 7/2006 | Collier-Hallman et al. | ..... | 324/163 |
| 7,145,309 B2 * | 12/2006 | Reiter et al. | ..... | 318/696 |
| 7,231,838 B2 * | 6/2007 | Sasaki | ..... | 73/862.31 |

(Continued)

FOREIGN PATENT DOCUMENTS

EP  2 042 842  4/2009

(Continued)

*Primary Examiner* — Eduardo Colon Santana
(74) *Attorney, Agent, or Firm* — Harness, Dickey & Pierce, PLC

(57) ABSTRACT

An indicating instrument includes a step motor having a field winding, a pointer, a reduction gear mechanism having gears, a stopper device for stopping the pointer at a stopper position, a detecting device for detecting induced voltage of the winding at each of detecting points that include a zero point corresponding to the stopper position, a control device for controlling a drive signal, and an updating device for updating the zero point based on the induced voltage during zero-reset control performed by the control device. The control device performs return control, whereby the pointer rotates to a return point in an indication value increasing direction and then returns to a waiting point in a zero-reset direction to stand by at the waiting point, prior to zero-reset control, whereby the pointer rotates from the waiting point in the zero-reset direction.

4 Claims, 9 Drawing Sheets

U.S. PATENT DOCUMENTS

| | | | |
|---|---|---|---|
| 7,233,255 B2 * | 6/2007 | Baba | 340/688 |
| 2009/0277373 A1 * | 11/2009 | Sasaki et al. | 116/62.1 |
| 2010/0192836 A1 * | 8/2010 | Nakane | 116/297 |
| 2010/0242570 A1 * | 9/2010 | Nakane | 73/1.75 |
| 2011/0100290 A1 * | 5/2011 | Nakane et al. | 116/286 |

FOREIGN PATENT DOCUMENTS

| | | |
|---|---|---|
| JP | 2001-327192 | 11/2001 |
| JP | 2002-084791 | 3/2002 |

* cited by examiner

INDICATING INSTRUMENT FOR VEHICLE

CROSS REFERENCE TO RELATED APPLICATION

This application is based on and incorporates herein by reference Japanese Patent Application No. 2009-25215 filed on Feb. 5, 2009.

BACKGROUND OF THE INVENTION

1. Field of the Invention

The present invention relates to an indicating instrument for a vehicle.

2. Description of Related Art

Conventionally, an indicating instrument for a vehicle that rotates a pointer by decelerating and transmitting to the pointer the rotation of a step motor through a reduction gear mechanism, is known. The pointer indicates a vehicle state value, which is indicated with a zero value as a reference, in accordance with a rotational position. An indicating instrument for a vehicle that rotates a pointer through the application of a drive signal of an alternating current, which alternates in accordance with an electrical angle, to a field winding of a step motor, is described in, for example, Japanese Patent No. 3770095 (corresponding to U.S. Pat. No. 6,624,608 B2).

In the indicating instrument for a vehicle according to Japanese Patent No. 3770095, the pointer that is rotated in a zero-reset direction, which is a direction to return the pointer back to a position of a zero value, is stopped at a stopper position by a stopper mechanism. While the pointer is rotating in the zero-reset direction, an induced voltage is generated in the field winding of the step motor. When the pointer stops, the induced voltage decreases. Accordingly, in zero-reset control that rotates the pointer in the zero-reset direction through drive signal control from a waiting point, which is a predetermined electrical angle, if a detected voltage of the induced voltage is equal to or smaller than a set value, it is determined that the pointer has stopped at the stopper position, and an electrical angle that corresponds to this stopper position is updated. As a result, even if the step motor loses synchronization due to disturbance such as vibration prior to start up of the instrument, so that a rotational position of the pointer is misplaced, the rotation of the pointer is controlled based on the updated electrical angle.

In a reduction gear mechanism that constitutes the indicating instrument for a vehicle of Japanese Patent No. 3770095, a backlash inevitably exists between gears that are in engagement with each other. For that reason, even though the step motor starts to rotate by a start of the zero-reset control from the waiting point, the engagement between these gears may be retarded because of the backlash between the gears in the reduction gear mechanism. In this case, because a speed of the rotation of the step motor is reduced in accordance with formation of an engagement state between the gears, as illustrated in a first diagram of FIG. 15, after the rotation of the motor is delayed relative to a target that corresponds to the drive signal, the speed of the rotation of the motor is increased so as to make up for the delay. When a rotational speed of the step motor (i.e., angular velocity in a second diagram in FIG. 15) exceeds the target speed as a result of such a speed increasing operation, even though the pointer rotates to the stopper position, the detected voltage of the induced voltage is not equal to or smaller than the set value, and the electrical angle that corresponds to the stopper position may be erroneously updated. Therefore, due to a drive signal based on the erroneously updated electrical angle, an unexpected loss of synchronization of the step motor, for example, is caused, so that the rotation of the pointer cannot be accurately controlled. Accordingly, it is hoped that the indicating instrument is improved in the above-described respects.

SUMMARY OF THE INVENTION

The present invention addresses at least one of the above disadvantages.

According to the present invention, there is provided an indicating instrument for a vehicle including a step motor, a pointer, a reduction gear mechanism, a stopper means, a detecting means, a control means, and an updating means. The step motor includes a field winding and is rotated upon application of a drive signal to the field winding. The drive signal is an alternating current that alternates in accordance with an electrical angle. The pointer points to a vehicle state value, which is indicated with a zero value as a reference thereof, in accordance with a rotational position of the pointer, and the pointer is rotated in a zero-reset direction to return to a zero position that indicates the zero value. The reduction gear mechanism includes a plurality of gears in engagement with each other. The reduction gear mechanism reduces a speed of rotation of the step motor and transmits the rotation of the step motor to the pointer thereby rotating the pointer. The stopper means is for stopping the pointer, which is rotating in the zero-reset direction, at a stopper position that is located within a predetermined range from the zero position in the zero-reset direction. The detecting means is for detecting an induced voltage generated in the field winding at each of a plurality of detecting points, which are electrical angles and include a zero point corresponding to the stopper position. The control means is for controlling the drive signal applied to the field winding. An electrical angle, a phase of which is shifted from the zero point, is a waiting point. An electrical, angle, a phase of which is shifted from the waiting point in a direction opposite from the zero point, is a return point. The control means performs zero-reset control, whereby the control means controls the drive signal so as to rotate the pointer from the waiting point in the zero-reset direction. The control means performs return control, whereby the control means controls the drive signal so as to rotate the pointer to the return point in an indication value increasing direction opposite from the zero-reset direction and then the control means controls the drive signal so as to return the pointer to the waiting point in the zero-reset direction thereby making the pointer stand by at the waiting point. The control means carries out the return control prior to the zero-reset control. The updating means is for updating the zero point based on the induced voltage detected by the detecting means during the zero-reset control that is performed by the control means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the invention will be described below with reference to the accompanying drawings. An indicating instrument 1 for a vehicle is disposed in front of a driver seat inside the vehicle as a vehicle speed meter.

Figure 1:
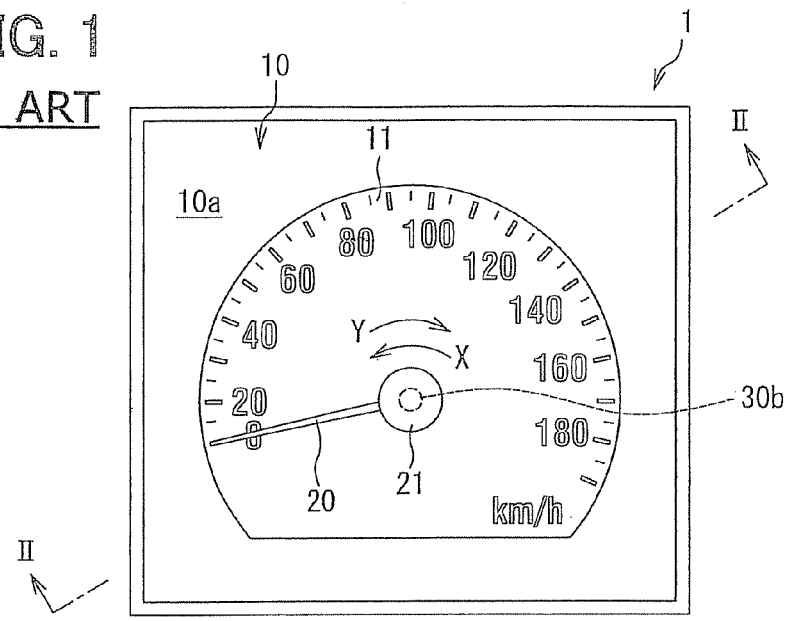
FIG. 1 is a front view illustrating an indicating instrument for a vehicle in accordance with an embodiment of the invention.
Figure 2:
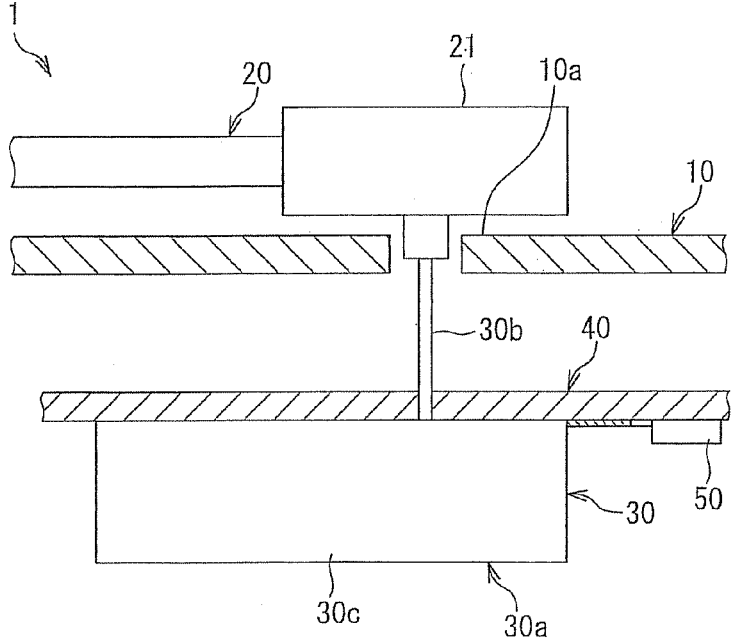
FIG. 2 is a vertical cross-sectional view taken along a line II-II in FIG. 1.
Figure 3:
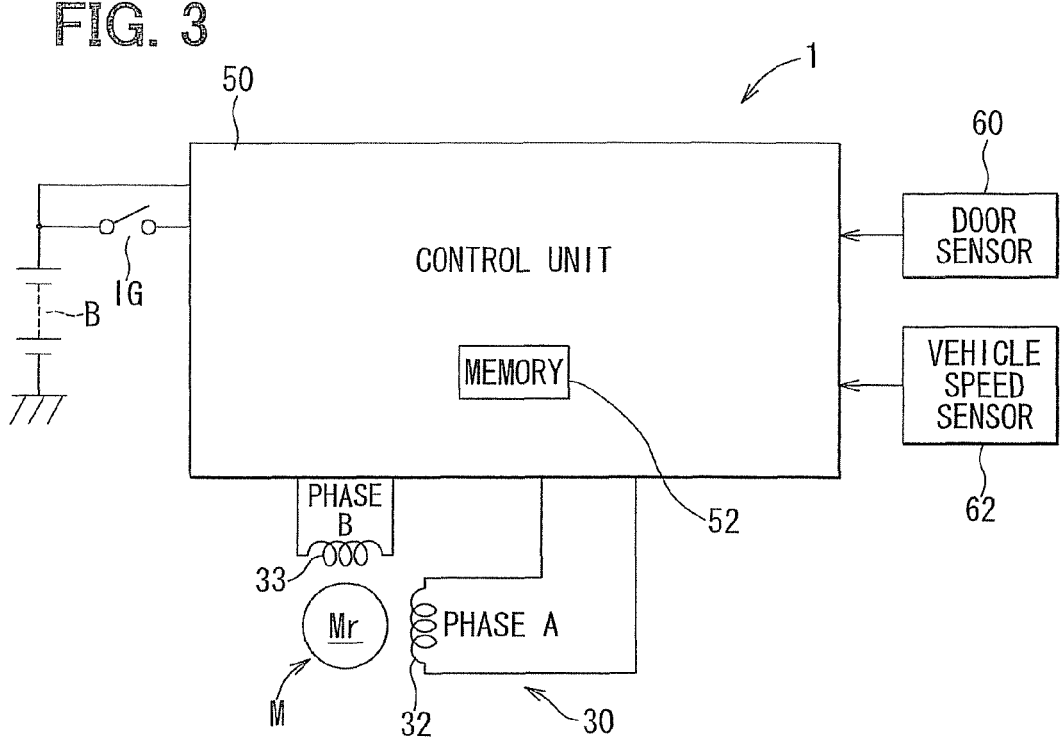
FIG. 3 is a block diagram illustrating an electric circuit configuration of the indicating instrument for the vehicle in accordance with the embodiment.

A structure of the indicating instrument 1 will be described in detail below. As illustrated in FIGS. 1 to 3, the indicating instrument 1 includes an instrument board 10, a pointer 20, a rotating inner device 30, a board 40, and a control unit 50. The control unit 50 may serve as a "detecting means," a "control means," or an "updating means".

The instrument board 10 illustrated in FIGS. 1 and 2 is disposed with its display surface 10a directed toward the driver seat, and includes a vehicle speed display 11 that displays a vehicle speed value as a vehicle state value. The vehicle speed display 11 displays vehicle speed values in a shape of a circular arc from a zero value (0 km/h), which serves as their reference value, to an upper limit (180 km/h).

The pointer 20 is coupled to a pointer shaft 30b of the rotating inner device 30 on its base end portion 21 side, and rotatable in a zero-reset direction X and in a speed increasing direction (indication value increasing direction) Y, which is opposite from the direction X, along the display surface 10a of the instrument board 10. Accordingly, the pointer 20, which indicates a vehicle speed value in accordance with a rotational position among those displayed on the vehicle speed display 11, is returnable back to a zero position that indicates the zero value, by its rotation in the zero-reset direction X as illustrated in FIG. 1.

As illustrated in FIG. 2, the rotating inner device 30 includes a main body 30a of the inner device, the pointer shaft 30b, and a casing 30c. The main body 30a is disposed on a back surface side of the board 40 which is generally parallel to the instrument board 10. The main body 30a includes a two-phase step motor M, a reduction gear mechanism G, and a stopper mechanism S that may serve as a "stopper means" (see FIG. 4), which are incorporated into the casing 30c. The pointer shaft 30b is supported by the casing 30c, which is fixed on the back surface of the board 40, and passes through the board 40 and the instrument board 10 to hold the base end portion 21 of the pointer 20. Accordingly, the main body 30a may rotate the pointer shaft 30b, which is coaxial with an output stage gear 34 of the reduction gear mechanism G, and eventually, the pointer 20 by deceleration rotation of the reduction gear mechanism G that is in synchronization with rotation of the step motor M.

Figure 4:
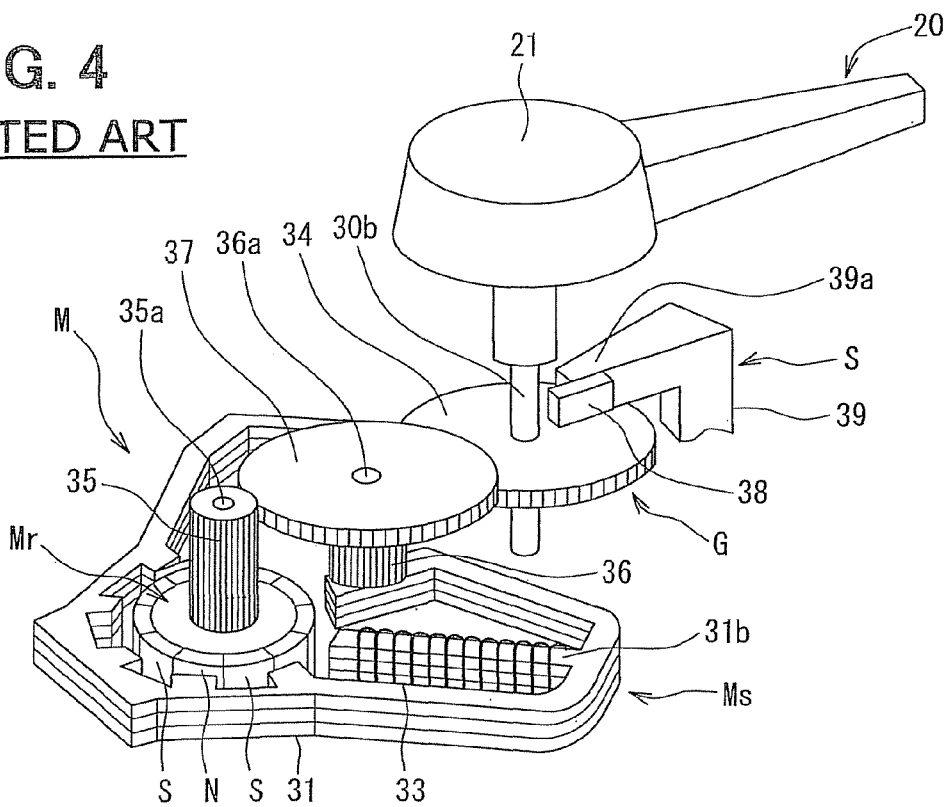
FIG. 4 is a perspective view illustrating a main feature of the indicating instrument for the vehicle in accordance with the embodiment.
Figure 5:
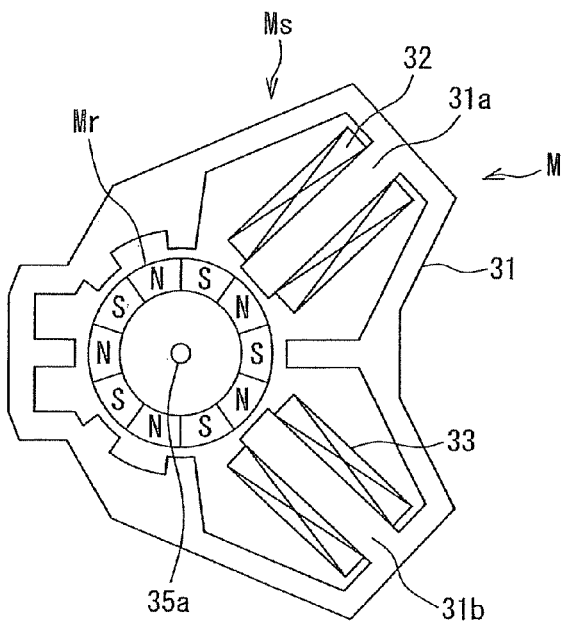
FIG. 5 is a plan view illustrating the main feature of the indicating instrument for the vehicle in accordance with the embodiment.

As illustrated in FIGS. 4 and 5, the step motor M includes a stator Ms and a magnet rotor Mr, which are combined together. The stator Ms has a yoke 31 and two field windings 32, 33. The yoke 31 includes a pair of magnetic poles 31a, 31b having a shape of a pole, and an A-phase field winding 32 is wound around the magnetic pole 31a, whereas a B-phase field winding 33 is wound around the magnetic pole 31b. The magnet rotor Mr is fixed to a rotatable shaft 35a of the reduction gear mechanism G coaxially with the rotatable shaft 35a. Clearances are formed between a peripheral surface of the magnet rotor Mr and front end surfaces of the magnetic poles 31a, 31b of the yoke 31, and a north pole and a south pole serving as magnetic poles are formed alternately on the peripheral surface of the magnet rotor Mr in a rotational direction of the rotor Mr.

In the step motor M having the above-described structure, an A-phase drive signal of such an alternating current that voltage alternates in the shape of a cosine function in accordance with the electrical angle (see FIG. 6) is applied to the A-phase field winding 32. On the other hand, a B-phase drive signal of such an alternating current that the voltage alternates in the shape of a sine function in accordance with the electrical angle (see FIG. 6) is applied to the B-phase field winding 33. As above, the A-phase and B-phase drive signals are out of phase with each other by 90 degrees. Consequently, alternate current (AC) magnetic fluxes are generated in the field windings 32, 33, to which such A-phase and B-phase drive signals are respectively applied. The AC magnetic fluxes pass between the yoke 31 and the magnetic poles of the magnet rotor Mr. Accordingly, the magnet rotor Mr rotates in accordance with voltage changes of the A-phase and B-phase drive signals, which are associated with the electrical angle.

As illustrated in FIG. 4, the reduction gear mechanism G includes gears 34, 35, 36, 37, which are spur gears. The output stage gear 34 is coupled to the pointer shaft 30b coaxially with the shaft 30b. The input stage gear 35 is supported by the rotatable shaft 35a that is fixed to the casing 30c coaxially with the shaft 35a. The intermediate gears 36, 37 are supported by a rotatable shaft 36a, which is fixed to the casing 30c, coaxially with the shaft 36a, so that the gears 36, 37 are made integrally rotatable. The intermediate gear 36 is engaged with the output stage gear 34, whereas the intermediate gear 37 is engaged with the input stage gear 35.

Figure 6:
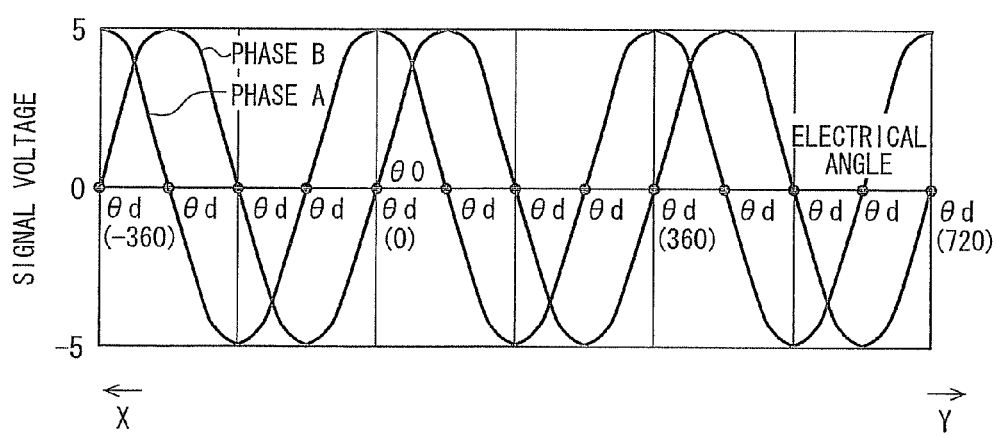
FIG. 6 is a characteristic graph illustrating a drive signal of the indicating instrument for the vehicle in accordance with the embodiment.

Because of the above-described structure of the reduction gear mechanism G, the mechanism G reduces speed of rotation of the magnet rotor Mr of the step motor M, which is connected to the input stage gear 35, so as to transmit the decelerated rotation to the pointer 20, which is connected to the output stage gear 34. Therefore, as the A-phase and B-phase drive signals change in accordance with the electrical angle, a rotational position of the magnet rotor Mr changes, so that a rotational position of the pointer 20 also changes. In addition, as illustrated in FIG. 6, in the present embodiment, a direction in which the electrical angle decreases corresponds to the zero-reset direction X of the pointer 20, and a direction in which the electrical angle increases corresponds to the speed increasing direction Y of the pointer 20.

Figure 7:
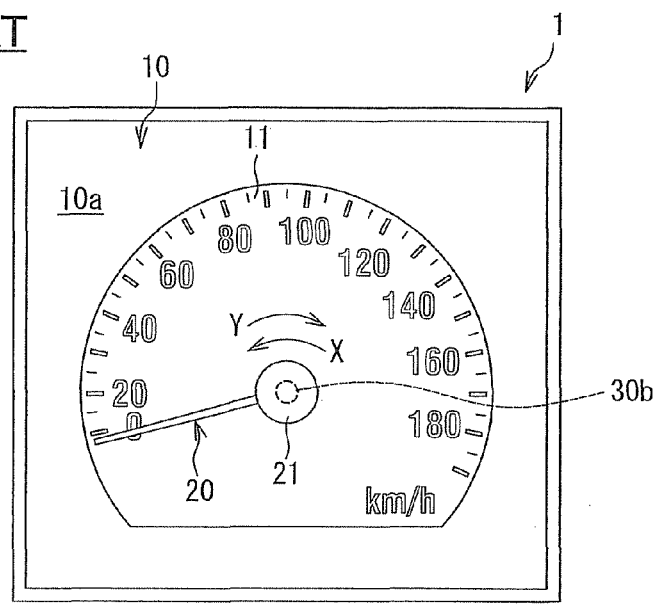
FIG. 7 is a front view illustrating an operating state of the indicating instrument for the vehicle in accordance with the embodiment, which is different from FIG. 1.

As illustrated in FIG. 4, the stopper mechanism S includes a contact member 38 and a stopper member 39. The contact member 38 is formed in the shape of a thin strip of a plate that projects from the output stage gear 34, and rotatable integrally with the gear 34. The stopper member 39 is formed so as to have an L-shaped structure that projects from the casing 30c inward of the casing 30c. Along a rotating track of the contact member 38, a front end portion 39a of the stopper member 39 on its projection side is located further in a direction corresponding to the zero-reset direction X than the contact member 38. Thus, when the contact member 38 is engaged with the front end portion 39a of the stopper member 39 as a result of the rotation of the pointer 20 in the zero-reset direction X, the pointer 20 stops at a stopper position within a predetermined range from the zero position in the zero-reset direction X, as illustrated in FIG. 7.

Particularly, the stopper position is set at the time of production of the instrument 1, for instance, within a range of 450 degrees in terms of the electrical angle of the step motor M from the zero position of the pointer 20 in the direction corresponding to the zero-reset direction X. Accordingly, in the step motor M of the present embodiment, a zero point 90 (zero degree) of the electrical angle is updated to the electrical angle that corresponds to the stopper position by initial processing, which is described in greater detail hereinafter. Furthermore, as regards the step motor M, in the present embodiment, a waiting point 9w, which is out of phase with the zero point θ0 in a direction corresponding to the speed increasing direction Y, and a return point θr, which is out of phase with the waiting point θw on the opposite side from the zero point θ0 (i.e., in the direction corresponding to the speed increasing direction Y), are set as control target points of the electrical angle in the initial processing.

As illustrated in FIG. 2, the control unit 50 is configured to mainly include a microcomputer, and mounted on the board 40. As illustrated in FIG. 3, the control unit 50 includes a memory 52. The latest zero point θ0 as a result of the update by the initial processing is continually stored in the memory 52. An execution program for performing various processings including the initial processing and normal processing (described in greater detail hereinafter), and predetermined phase intervals ΔP1, ΔP2, ΔP3, are stored in advance in the memory 52. The first phase interval ΔP1 is a preset value as a difference between the waiting point θw and the zero point θ0. The second phase interval ΔP2 is a value obtained by measuring or estimating beforehand (e.g., at the time of factory shipments) then by expressing in terms of the electrical angle of the step motor M the sum of the amount of backlashes between the gears 34 and 36 of the mechanism G, which are in engagement with each other, and between the gears 35 and 37 of the mechanism G, which are in engagement with each other. The third phase interval ΔP3 is a value calculated beforehand as a difference between the electrical angle of the step motor M corresponding to the zero position of the pointer 20, and the zero point θ0 that is initialized corresponding to the stopper position of the pointer 20 (see FIG. 7) at the time of factory shipments, for example.

The control unit 50 is electrically connected to a door sensor 60 of the vehicle, an ignition switch IG, and a battery power source B. The control unit 50 is started by a direct electric supply from the battery power source B when opening of a door of the vehicle is detected by the door sensor 60. If the ignition switch IG is turned on before a set period (e.g., 2 minutes) elapses, the control unit 50 that has been started maintains an operating state by the electric supply from the battery power source B. After that, the operation of the control unit 50 is stopped as a result of turning off of the ignition switch IG. The control unit 50 that has been started stops its operation temporarily if the ignition switch IG is not turned on before the set period elapses. When the ignition switch IG is turned on after that, the control unit 50 is restarted. The control unit 50 stops its operation as a result of the turning off of the ignition switch IG. The restart of the control unit 50 is carried out in response to turning on of the ignition switch IG. Alternatively, the control unit 50 may be restarted in response to, for example, the opening of the door of the vehicle or depression of a brake pedal of the vehicle.

As illustrated in FIG. 3, the control unit 50 is electrically connected to the field windings 32, 33 of the step motor M. In the initial processing, the control unit 50 detects induced voltage that is generated in the field windings 32, 33, controlling the A-phase and B-phase drive signals which are applied to the field windings 32, 33.

More specifically, at the electrical angle where signal voltages of the A-phase and B-phase drive signals are larger than zero (0V), a route to apply the signals to corresponding field windings 32, 33 is electrically connected to the control unit 50, and a route to detect the induced voltage generated in the corresponding windings is closed, by a switching function. At the electrical angle where the signal voltages of the A-phase and B-phase drive signals are zero, the route to apply the signals to the corresponding field windings 32, 33 is closed, and the route to detect the induced voltage generated in the corresponding windings is electrically connected to the control unit 50, by the switching function. Accordingly, in the present embodiment, in which the A-phase and B-phase drive signals alternate in the shape of the cosine function and in the shape of the sine function in accordance with the electrical angle, the electrical angle where the signal voltages are zero, i.e., the zero point θ0 and the electrical angles whose phases are shifted from the zero point θ0 at intervals of 90 degrees (indicated by black dots in FIG. 6), are set at detecting points θd of the induced voltage. In addition, as for the above-described switching function of the control unit 50, the connection and cutoff of the route may be carried out at every detecting point θd, for example, by the switching processing in the microcomputer that constitutes the control unit 50, or the connection and cutoff of the route may be carried out at every detecting point θd by switching between input and output ports of the microcomputer.

As illustrated in FIG. 3, the control unit 50 is electrically connected to a vehicle speed sensor 62. In the normal processing after the initial processing, the control unit 50 makes the pointer 20 indicate a vehicle speed value detected by the speed sensor 62 by controlling the A-phase and B-phase drive signals based on the zero point θ0 of the electrical angle. Here, with respect to the zero point θ0, the latest zero point θ0 that is updated by the last initial processing and stored in the memory 52 is employed.

Figure 8:
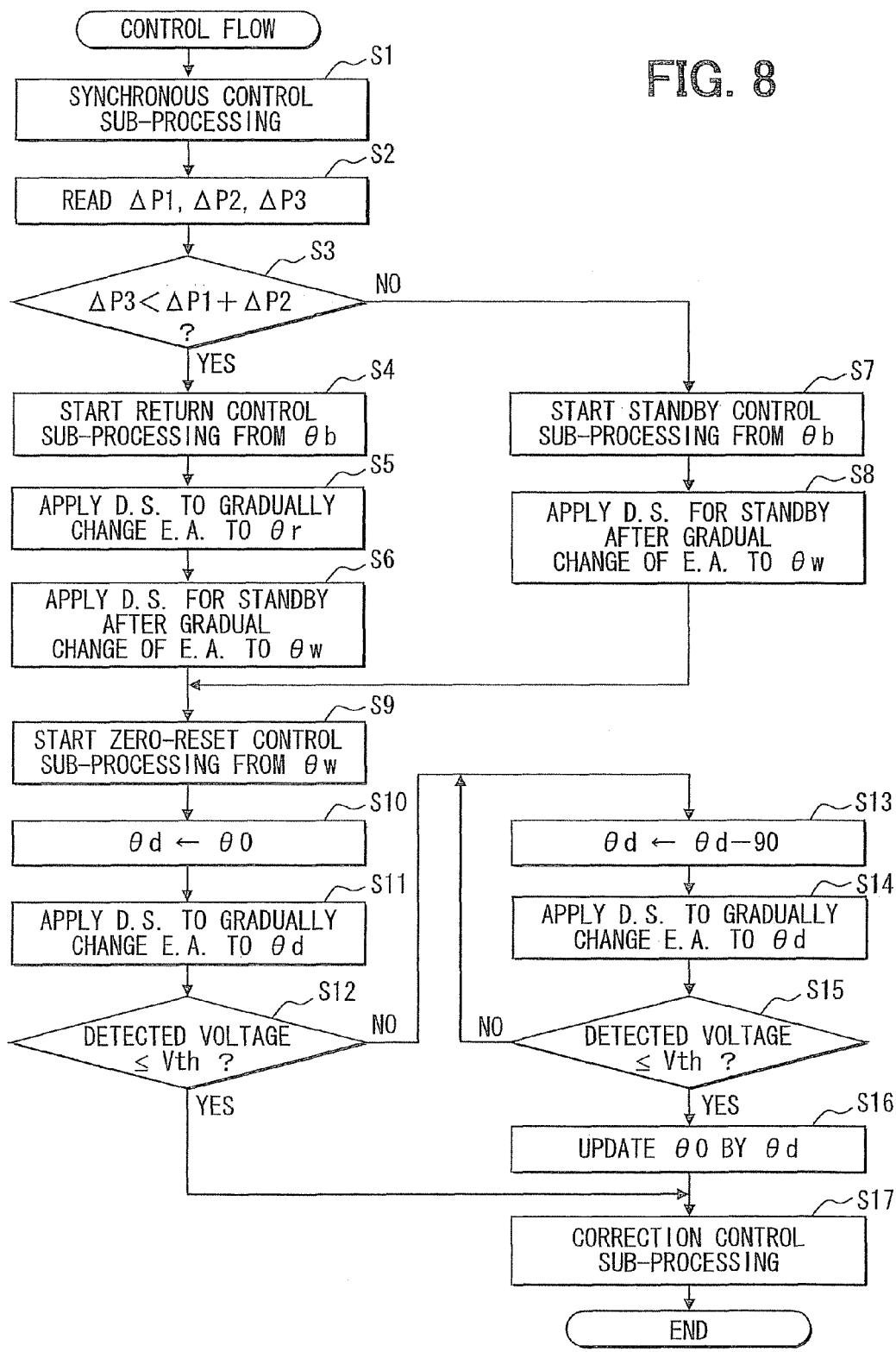
FIG. 8 is a flow chart illustrating a control flow of the indicating instrument for the vehicle in accordance with the embodiment.

A control flow for performing the initial processing by the control unit 50 will be described in detail below with reference to FIG. 8. This control flow is started upon the start of the control unit 50.

At S1 of the control flow, synchronous control sub-processing is performed. More specifically, in the synchronous control sub-processing, the zero point θ0 and the third phase interval ΔP3 that are stored in the memory 52 are first retrieved. Next, the electrical angle that is shifted from the zero point θ0 in the direction corresponding to the speed increasing direction Y by the third phase interval ΔP3, i.e., the electrical angle corresponding to the zero position of the pointer 20, is set at a reference point θb. Then, as the A-phase and B-phase drive signals, signals corresponding to the reference point θb are applied to the A-phase and B-phase field windings 32, 33. Furthermore, signals for synchronizing the magnetic poles of the magnet rotor Mr and the electrical angle by the rotation of the pointer 20 in the zero-reset direction X are applied to the A-phase and B-phase field windings 32, 33, as the A-phase and B-phase drive signals. Lastly, as the A-phase and B-phase drive signals, signals for returning the electrical angle back to the reference point θb are applied to the A-phase and B-phase field windings 32, 33. Accordingly, the rotational position of the pointer 20 is set at the zero position corresponding to the reference point θb.

At S2, the phase intervals ΔP1, ΔP2, ΔP3 stored in the memory 52 are retrieved. At S3, it is determined whether the third phase interval ΔP3 is smaller than the sum of the first and second phase intervals ΔP1, ΔP2. If the reference point θb is not further out of phase with the zero point θ0 than the waiting point θw, the third phase interval ΔP3 is smaller than the sum of the first and second phase intervals ΔP1, ΔP2. Therefore, a positive determination is made at S3. If the reference point θb is further out of phase with the zero point θ0 than the waiting point θw, the third phase interval ΔP3 is equal to or larger than the sum of the first and second phase intervals ΔP1, ΔP2. Thus, a negative determination is made at S3.

At S4, to which control proceeds as a result of the positive determination at S3, return control sub-processing is started from the reference point θb that is set at S1. At S5, signals for gradually changing the electrical angle to the return point θr are applied to the A-phase and B-phase field windings 32, 33 as the A-phase and B-phase drive signals. As a result, the pointer 20 is swung up to a position that corresponds to the return point θr in the speed increasing direction Y by rotary drive from the zero position corresponding to the reference point θb. At S6, as the A-phase and B-phase drive signals, signals for standing by at the waiting point θw after gradual change of the electrical angle to this waiting point θw are applied to the A-phase and B-phase field windings 32, 33. Consequently, the pointer 20 is returned in the zero-reset direction X by rotary drive from the position that corresponds to the return point θr so as to be in a stand-by state where the pointer 20 stands by at a position that corresponds to the waiting point θw. Through the above-described procedures, the return control sub-processing is ended.

As opposed to the return control sub-processing at S4 to S6, at S7 to which control proceeds as a result of the negative determination at S3, standby control sub-processing is started from the reference point θb that is set at S1. At S8, signals for standing by at the waiting point θw after gradual change of the electrical angle to this waiting point θw are applied to the A-phase and B-phase field windings 32, 33 as the A-phase and B-phase drive signals. Accordingly, the pointer 20 is swung down to the position that corresponds to the waiting point θw in the zero-reset direction X by the rotary drive from the zero position corresponding to the reference point θb so as to be in the stand-by state at the waiting point θw. Through the above-described procedures, the standby control sub-processing is ended.

In addition, the waiting point θw may be set at such a small value as to limit unattractiveness of the indicating instrument 1 because of the upward swing and the downward swing of the pointer 20 in the return control sub-processing and in the standby control sub-processing, and furthermore, at such a large value as to detect the induced voltage in zero-reset control sub-processing, which is described in greater detail hereinafter. For these reasons, in the present embodiment, for instance, the waiting point θw is set at the electrical angle that is out of phase with the zero point θ0 by 273 degrees of the first phase interval ΔP1 in the direction corresponding to the speed increasing direction Y. Moreover, the return point θr may be set at such a small value as to limit unattractiveness of the indicating instrument 1 due to the upward swing of the pointer 20 in the return control sub-processing, and furthermore, such that a phase interval between the return point θr and the waiting point θw is equal to or larger than the second phase interval ΔP2 stored in the memory 52. Accordingly, in the present embodiment, for example, the return point θr is set at such an electrical angle that a phase interval between this electrical angle and the waiting point θw is equal to the second phase interval ΔP2, which corresponds to the sum of the amount of backlashes between the gears 34, 36 of the mechanism G and between the gears 35, 37 of the mechanism G. The phase interval (ΔP2) between the waiting point θw and the return point θr may be set to be equal to or larger than a phase interval of the electrical angle that corresponds to the amount of the backlash between the gears of the reduction gear mechanism G which are in engagement with each other. Accordingly, by the return control from the return point θr to the waiting point θw, the backlash between the gears on their engagement side in the zero-reset control is reliably eliminated. Therefore, the appropriate update on the zero point θ0 is secured, so that accuracy of the control of rotation of the pointer 20 is improved. The phase interval (ΔP2) between the waiting point θw and the return point θr may be set to be equal to the phase interval of the electrical angle that corresponds to the amount of the backlash between the gears of the reduction gear mechanism G which are in engagement with each other. Accordingly, by the return control with the amount of the upward swing of the pointer 20 limited, the backlash between the gears on their engagement side in the zero-reset control is reliably eliminated. Therefore, accuracy of the control of rotation of the pointer 20 is improved without deteriorating the appearance of the indicating instrument 1 due to the upward swing of the pointer 20 in the return control.

Upon completion of the steps S6, S8 that branch from S3, control proceeds to S9, at which the zero-reset control sub-processing for rotating the pointer 20 in the zero-reset direction X is started from the waiting point θw. At S10, the zero point θ0 stored in the memory 52 is retrieved, and the zero point θ0, which is further in the direction corresponding to the zero-reset direction X than the waiting point θw, is set at the present detecting point θd. At S11, signals for gradually changing the electrical angle to the detecting point θd, which is set at S10, are applied to the A-phase and B-phase field windings 32, 33, as the A-phase and B-phase drive signals. At S12, induced voltage of a detection winding of the A-phase and B-phase field windings 32, 33 whose drive signal has zero of voltage at the present detecting point θd is detected, and whether this detected voltage is equal to or smaller than a set value Vth is determined.

If a negative determination is made as a result of the detected voltage exceeding the set value Vth at S12, control proceeds to S13. At S13, an electrical angle whose phase is shifted by 90 degrees in the direction corresponding to the zero-reset direction X from the detecting point θd (set at S10), is set at the present detecting point θd. At S14, signals for gradually changing the electrical angle to the detecting point θd, which is set at S13, are applied to the A-phase and B-phase field windings 32, 33 as the A-phase and B-phase drive signals. At S15, according as S12, induced voltage of a detection winding is detected, and whether this detected voltage is equal to or smaller than a set value Vth is determined.

As long as a negative determination is made at S15, control returns to S13, and the procedures at S13 and the following steps S14, S15 are repeated. If a positive determination is made at S15, control proceeds to S16. At S16, it is determined that the detecting point θd, which is set at the immediately preceding step S13, is the present zero point θ0 corresponding to the stopper position of the pointer 20, and accordingly, the zero point θ0, which is stored in the memory 52, is updated by this detecting point θd.

After completion of the step S16, at which the zero point θ0 is updated, or if a positive determination is made at S12 as a result of the detected voltage being equal to or smaller than the set value Vth, control proceeds to S17 to perform correction control sub-processing. More specifically, in the correction control sub-processing, the latest zero point θ0, which is stored in the memory 52, is first retrieved, then the reference point θb based on this zero point θ0 is set in accordance with the step S1. Next, the A-phase and B-phase drive signals are applied to the A-phase and B-phase field windings 32, 33 in a manner such that the electrical angle, which is temporarily made larger than this set reference point θb, is gradually changed to the reference point θb. Accordingly, the rotational position of the pointer 20 is set at the zero position corresponding to the reference point θb. Through the above-described procedures, the present initial processing is completed, and the following normal processing is started.

Figure 9:
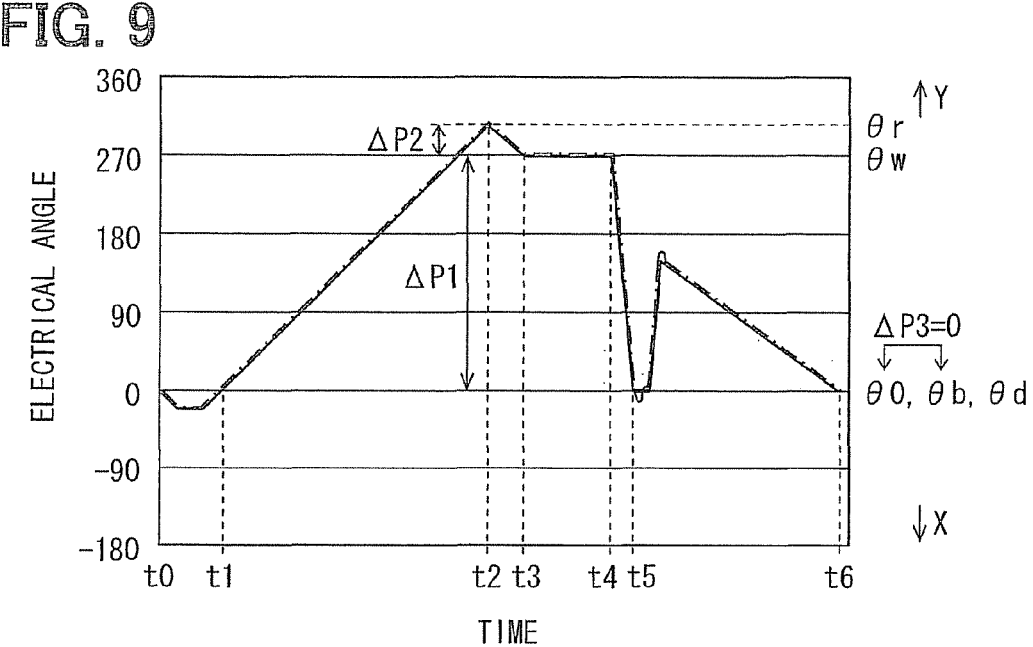
FIG. 9 is a characteristic graph illustrating a first exemplary operation of the indicating instrument for the vehicle in accordance with the embodiment.
Figure 10:
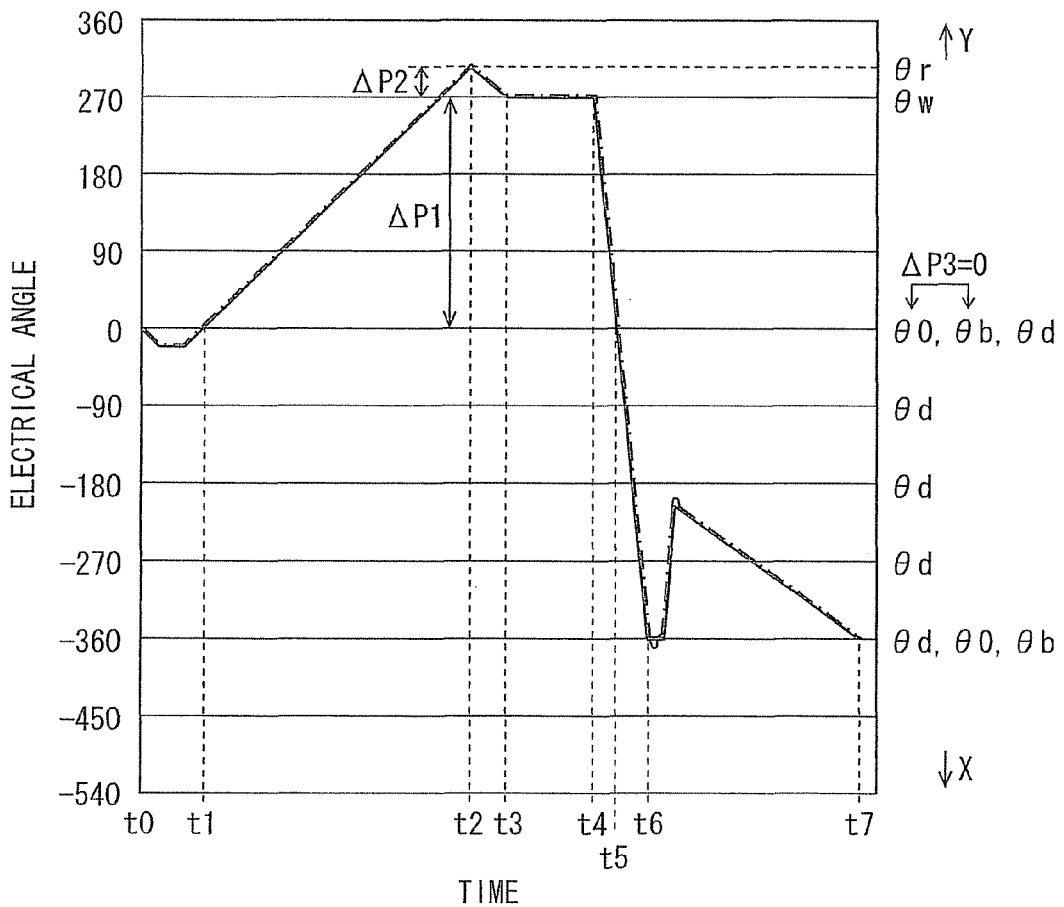
FIG. 10 is a characteristic graph illustrating a second exemplary operation of the indicating instrument for the vehicle in accordance with the embodiment.
Figure 11:
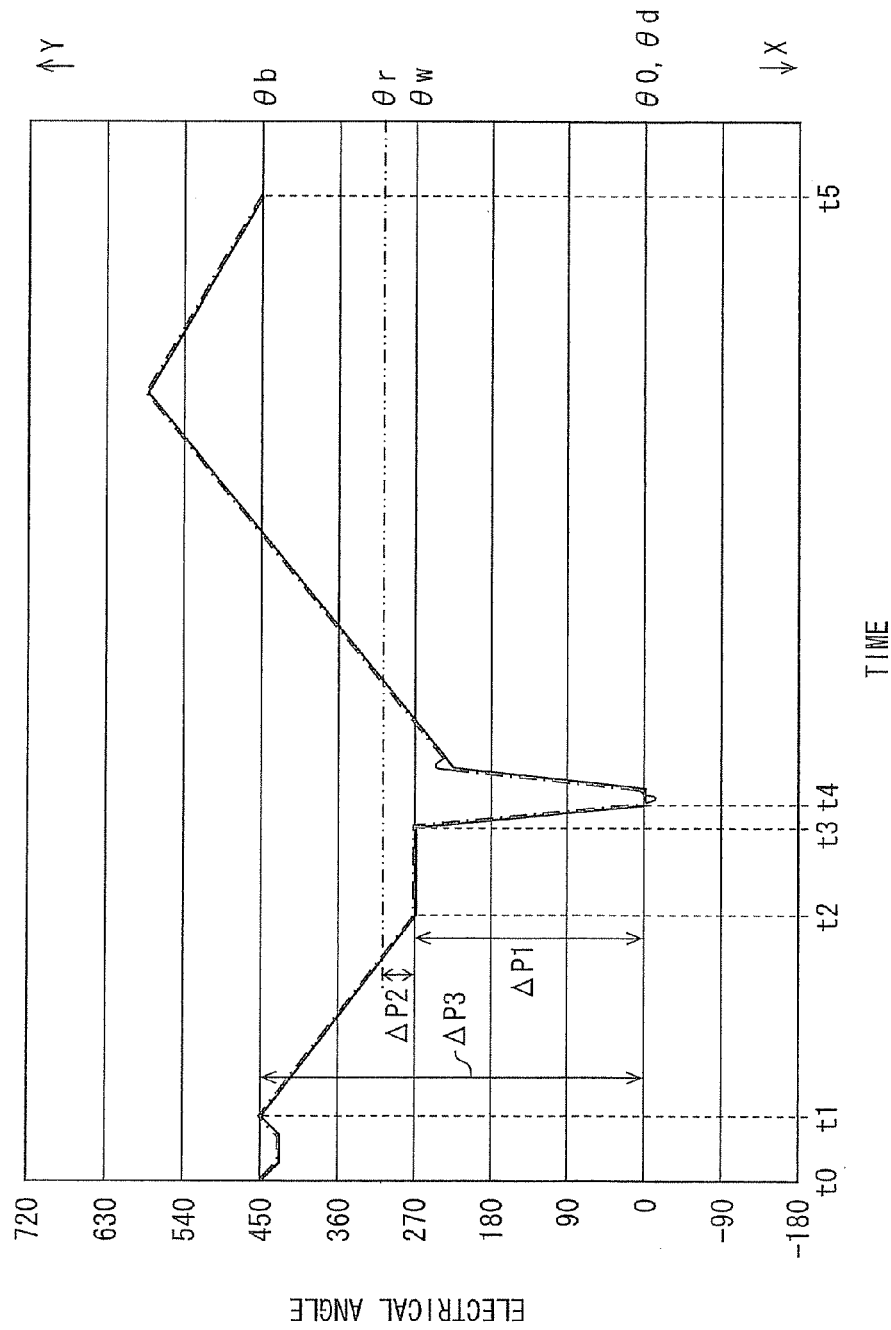
FIG. 11 is a characteristic graph illustrating a third exemplary operation of the indicating instrument for the vehicle in accordance with the embodiment.

Exemplary operations realized by the above-described initial processing will be described below with reference to FIGS. 9 to 11. In graphs of FIGS. 9 to 11, a continuous line indicates a change of the electrical angle with time, and an alternate long and short dash line indicates a change of the rotational position of the pointer 20 with time using its corresponding temporal change in the electrical angle.

A first exemplary operation will be explained below. FIG. 9 illustrates that the third phase interval ΔP3 is 0 (zero) degree, which is smaller than the sum of the first and second phase intervals ΔP1, ΔP2 and that the pointer 20 is not shifted from the zero position of the pointer 20 before the start of the control unit 50.

When the initial processing is started upon the start of the control unit 50, after the electrical angle changes to the reference point θb, which coincides with the zero point θ0, so that the rotational position of the pointer 20 is set at the zero position, the magnet rotor Mr and the electrical angle are synchronized and the pointer 20 is returned to this zero position (t0 to t1), by the synchronous control sub-processing.

Next, upon start of the return control sub-processing, the electrical angle reaches the waiting point θw that is out of phase with the reference point θb, which coincides with the zero point θ0, by 273 degrees in the direction corresponding to the speed increasing direction Y. Then, the electrical angle changes to the return point θr, which is shifted from this waiting point θw by the second phase interval ΔP2 in the direction corresponding to the speed increasing direction Y. As a result, the pointer 20 rotates from the zero position corresponding to the reference point θb in the speed increasing direction Y, and is swung up to a position corresponding to the return point θr (t1 to t2).

By continued return control sub-processing, the electrical angle changes to the waiting point θw, which is shifted from the return point θr by the second phase interval ΔP2 in the direction corresponding to the zero-reset direction X. Consequently, the pointer 20 rotates in the zero-reset direction X from the position corresponding to the return point θr to return to a position corresponding to the waiting point θw (t2 to t3), and the pointer 20 is thereby in the stand-by state for the zero-reset control sub-processing (t3 to t4).

Then, upon start of the zero-reset control sub-processing, the electrical angle changes to the first detecting point θd, which coincides with the zero point θ0, so that the pointer 20 stops at the stopper position in the zero-reset direction X. At this time, the detected voltage of the induced voltage of the detection winding 33 is equal to or smaller than the set value Vth (t4 to t5).

After the above-described procedures, the correction control sub-processing is started. As a result, the electrical angle becomes larger temporarily than the reference point θb, which coincides with the zero point θ0, and then returns back to this reference point θb. In consequence, the pointer 20 rotates to the zero position, and the initial processing is ended (t5 to t6).

A second exemplary operation will be explained below. FIG. 10 illustrates that the third phase interval ΔP3 is 0 (zero) degree, which is smaller than the sum of the first and second phase intervals ΔP1, ΔP2 and that the pointer 20 is shifted from the zero position by 360 degrees in terms of the electrical angle before the start of the control unit 50.

When the initial processing is started upon the start of the control unit 50, similar to the first exemplary operation, the synchronous control sub-processing and the return control sub-processing are performed (t0 to t4).

Next, upon start of the zero-reset control sub-processing, the electrical angle changes to the first detecting point θd, which coincides with the zero point θ0. However, due to the shift of the pointer 20 from the zero position before the start of the control unit 50, the pointer 20 has not rotated up to the stopper position, and thus cannot stop. Accordingly, the detected voltage of the induced voltage of the detection winding 33 exceeds the set value Vth (t4 to t5).

When the zero-reset control sub-processing continues for this reason, so that the detecting point θd proceeds to the electrical angle that is out of phase with the zero point θ0 by 360 degrees in the direction corresponding to the zero-reset direction X, the pointer 20 rotates to the stopper position and stops. As a result, the detected voltage of the induced voltage of the detection winding 33 is equal to or smaller than the set value Vth (t5 to t6).

After the above-described procedures, by the correction control sub-processing which is similar to that of the first exemplary operation, the pointer 20 rotates to the zero position, and the initial processing is ended (t6 to t7).

A third exemplary operation will be explained below. FIG. 11 illustrates that the third phase interval \P3 is 450 degrees, which is equal to or larger than the sum of the first and second phase intervals ΔP1, ΔP2, and that the pointer 20 is not shifted from the zero position of the pointer 20 prior to the start of the control unit 50.

When the initial processing is started upon the start of the control unit 50, by the synchronous control sub-processing, after the electrical angle changes to the reference point (reference electrical angle) θb, which is out of phase with the zero point θ0 by 450 degrees in the direction corresponding to the speed increasing direction Y, so that the rotational position of the pointer 20 is set at the zero position, the magnet rotor Mr and the electrical angle are synchronized and the pointer 20 is returned to this zero position (t0 to t1).

Next, instead of the return control sub-processing carried out in the first exemplary operation, the standby control sub-processing is started. Accordingly, the electrical angle changes directly to the waiting point θw which is out of phase with the reference point θb by 177 degrees in the direction corresponding to the zero-reset direction X. As a result, the pointer 20 rotates from the zero position corresponding to the reference point θb in the zero-reset direction X, and is swung down to the position corresponding to the waiting point θw (t1 to t2). Then, the pointer 20 is in the stand-by state for the zero-reset control sub-processing (t2 to t3).

Following this, by the zero-reset control sub-processing similar to that of the first exemplary operation, the pointer 20 stops at the stopper position in the zero-reset direction X. At this time, the detected voltage of the induced voltage of the detection winding 33 is equal to or smaller than the set value Vth (t3 to t4). Then, by the correction control sub-processing similar to that of the first exemplary operation, the pointer 20 rotates to the zero position, and the initial processing is ended (t4 to t5).

Figure 12:
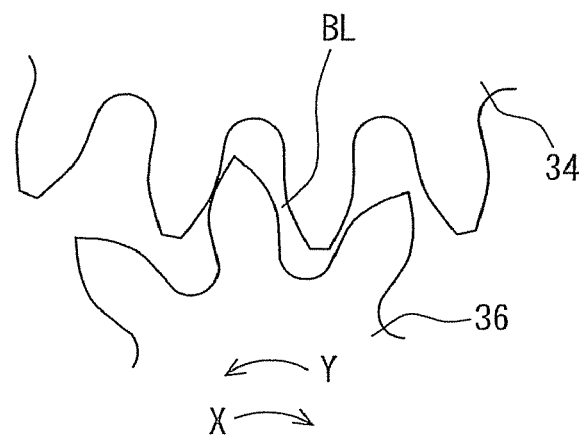
FIG. 12 is a diagram illustrating the operation of the indicating instrument for the vehicle in accordance with the embodiment and its effect.

As described in the first to third exemplary operation, in the present embodiment, if the difference between the reference point θb and the zero point θ0 is equal to the third phase interval ΔP3, which is smaller than the sum of the first phase interval ΔP1 between the waiting point θw and the zero point θ0, and the second phase interval ΔP2 corresponding to the sum of the amount of backlashes in the reduction gear mechanism G, the return control sub-processing is performed. In this return control sub-processing, as a result of the change of the electrical angle from the reference point θb that corresponds to the zero position of the pointer 20 to the return point θr, the pointer 20 is swung up in the speed increasing direction Y. Accordingly, between the gears 34, 36 of the mechanism G and between the gears 35, 37 of the mechanism G, a backlash BL is caused for the meantime on their engagement side at the time of the rotation of the pointer 20 in the zero-reset direction X, as shown in FIG. 12 (illustrating the gears 34, 36 only).

Figure 13:
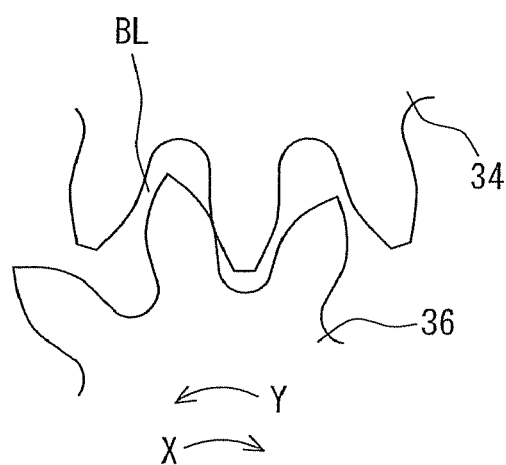
FIG. 13 is another diagram illustrating the operation of the indicating instrument for the vehicle in accordance with the embodiment and its effect.
Figure 14:
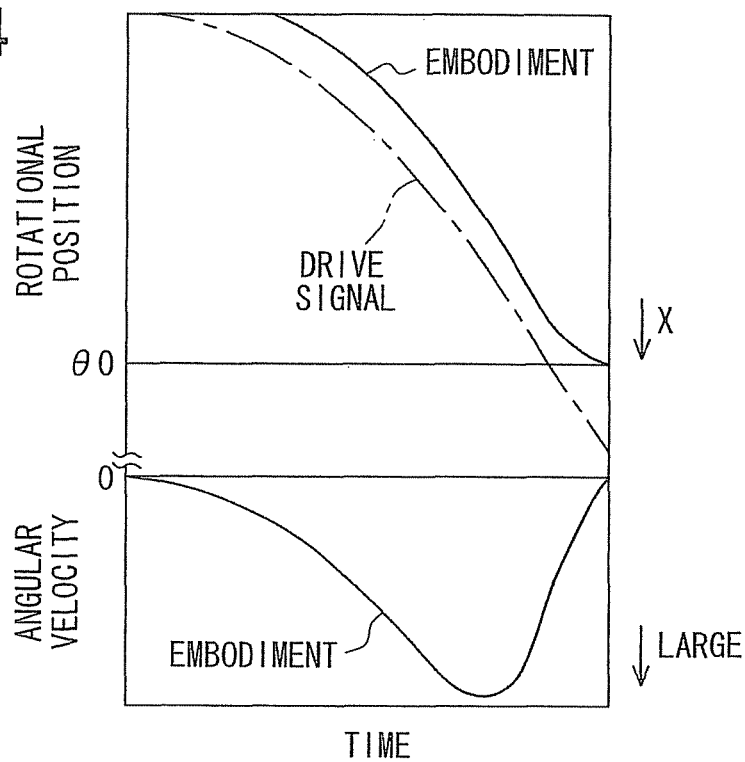
FIG. 14 is a characteristic graph illustrating the operation of the indicating instrument for the vehicle in accordance with the embodiment and its effect.
Figure 15:
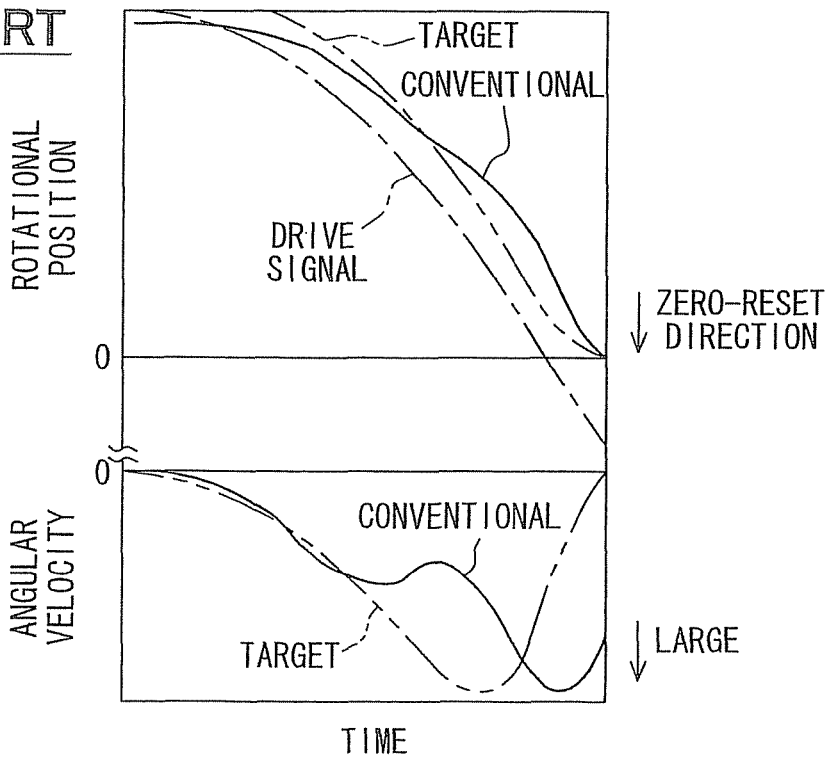
FIG. 15 is a characteristic graph illustrating a problem of a previously proposed indicating instrument that is to be solved by the invention.

However, in the return control sub-processing, the electrical angle changes further from the return point θr to the waiting point θw, so that the pointer 20 returns in the zero-reset direction X to be in the stand-by state. Between the gears 34, 36 and between the gears 35, 37 in this stand-by state, as shown in FIG. 13, which only illustrates the gears 34, 36, the backlash BL on their engagement side at the time of the rotation of the pointer 20 in the zero-reset direction X surely disappears. Therefore, in the zero-reset control sub-processing that drives the pointer 20 in the zero-reset direction X, engagements between the gears 34, 36 and between the gears 35, 37 are achieved from the waiting point θw, which is a starting point of the processing, and the step motor M thereby rotates in accordance with the drive signal as illustrated in FIG. 14. As a result, the updating of the zero point θ0 based on the detection of induced voltage equal to or smaller than the set value Vth when the pointer 20 rotates to the stopper position, is made appropriate. Thus, in the correction control sub-processing based on the zero point θ0 after the zero-reset control sub-processing, the rotational position of the pointer 20 is set accurately at the zero position, and in the following normal processing as well, accurate rotation control of the pointer 20 is fulfilled.

Moreover, in the present embodiment, on the other hand, if the difference between the reference point θb and the zero point θ0 is equal to the third phase interval ΔP3, which is equal to or larger than the sum of the first phase interval ΔP1 between the waiting point θw and the zero point θ0, and the second phase interval ΔP2 corresponding to the sum of the amount of backlashes in the reduction gear mechanism G, the standby control sub-processing is performed. In this standby control sub-processing, as a result of the direct change of the electrical angle from the reference point θb that corresponds to the zero position of the pointer 20 to the waiting point θw, instead of the upward swing of the pointer 20 in the speed increasing direction. Y, the pointer 20 is swung down in the zero-reset direction X so as to be in the stand-by state. Consequently, between the gears 34, 36 and between the gears 35, 37, as illustrated in FIG. 13, the backlash BL on their engagement side at the time of the rotation of the pointer 20 in the zero-reset direction X disappears. Accordingly, in the following zero-reset control sub-processing, the updating of the zero point θ0 is made appropriate, similar to the result after the return control sub-processing. Therefore, in the correction control sub-processing, the rotational position of the pointer 20 is set accurately at the zero position, and in the following normal processing as well, accurate rotation control of the pointer 20 is fulfilled. In addition, in the case of the standby control sub-processing which produces such an effect, the backlash BL is eliminated without swinging up the pointer 20 as in the return control sub-processing. As a consequence, the unattractiveness of the indicating instrument 1 due to this upward swing of the pointer 20 is limited and the processing time is shortened. According to the present embodiment described above, regardless of the phase shift of the electrical angle corresponding to the zero position of the pointer 20 relative to the zero point θ0, the zero-reset control is started with a state in which the backlash between the gears is eliminated from their engagement side. Therefore, the appropriate update on the zero point θ0 is realized, thereby promoting accurate control of the rotation of the pointer 20. Furthermore, when the phase of the electrical angle (θb) corresponding to the zero position of the pointer 20 is further shifted from the zero point θ0 than the waiting point θw, so that the third phase interval ΔP3 is equal to or larger than the sum of the first and second phase intervals ΔP1, ΔP2, by making the pointer 20 directly reach the waiting point θw from the electrical angle (θb) corresponding to the zero position, the backlash is eliminated without the upward swing of the pointer 20 in the speed increasing direction Y. As a result, the return control for making the electrical angle reach the return point θr, which is farther away from the zero point θ0 than the waiting point θw, and then return back to the position corresponding to the waiting point θw is limited to the time of need thereof. Accordingly, limitation of the unattractiveness of the indicating instrument 1 due to the upward swing of the pointer 20, and shortening of the processing time are achieved.

According to the embodiment of the invention, the pointer 20, which is rotated in the zero-reset direction X as a result of decelerating transmission of the rotation of the step motor M through the reduction gear mechanism G in the zero-reset control, stops at the stopper position within a predetermined range from the zero position in the zero-reset direction X. In such zero-reset control, because of the detection of induced voltage that exceeds the set value Vth at the zero point θ0 corresponding to the stopper position, due to the backlash between the gears of the reduction gear mechanism G which are in engagement with each other, the zero point θ0 may be erroneously updated. Accordingly, in the embodiment; the return control is performed prior to the zero-reset control. By this return control, the pointer 20 is rotated in the speed increasing direction Y as a result of the control of the drive signals applied to the field windings of the step motor M up to the return point θr, and then the pointer 20 is returned in the zero-reset direction X as a result of the control of the drive signals up to the waiting point θw so as to stand by at the waiting point θw. The return point θr is the electrical angle that is out of phase with the waiting point θw, from which the zero-reset control is started, to the opposite side from the zero point θ0. Therefore, by the return control from the return point θr to the waiting point θw, the backlash between the gears of the reduction gear mechanism G is eliminated from the engagement side between these gears in the zero-reset control. Because of such elimination of the backlash, in the zero-reset control, engagement between the gears is realized from the waiting point θw which is a starting point of the zero-reset control, so that a rotational speed of the step motor M becomes an appropriate speed that follows the drive signals. Accordingly, the detection of the induced voltage that exceeds the set value Vth when the pointer 20 rotates to the stopper position, is avoided. Thus, the zero point θ0 corresponding to the stopper position is appropriately updated, and the rotation of the pointer 20 is accurately controlled by the drive signals based on this zero point θ0.

The embodiment of the invention is described above. Nevertheless, the invention is not interpreted by limiting itself to the above-described embodiment, and may be applied to various embodiments without departing from the scope of the invention.

Modifications of the above embodiment will be described. More specifically, the return point θr may be set such that the phase interval between the return point θr and the waiting point θw is larger than the second phase interval ΔP2, which corresponds to the sum of the amount of backlashes between the gears 34, 36 of the mechanism G and between the gears 35, 37 of the mechanism G. Moreover, in the control flow, at least one of the synchronous control sub-processing at S1 and the correction control sub-processing at S17 does not need to be executed.

A device for engaging directly with the pointer 20 to stop the pointer 20 may be used as the "stopper means." Furthermore, as regards the A-phase and B-phase drive signals, as long as they are signals that alternate with a phase difference of 90 degrees between each other, the A-phase and B-phase drive signals may be signals other than those whose voltages change in the shape of a cosine function or sine function, e.g., signals that change in the shape of a trapezoidal wave or triangular wave. In addition, in respect to the vehicle state value indicated by the pointer 20, as long as it is a value related to various states of the vehicle, the vehicle state value may be a fuel remaining amount, coolant temperature, or an engine rotation speed, for example.

Additional advantages and modifications will readily occur to those skilled in the art. The invention in its broader terms is therefore not limited to the specific details, representative apparatus, and illustrative examples shown and described.

What is claimed is:

1. An indicating instrument for a vehicle comprising:
    a step motor that includes a field winding and is rotated upon application of a drive signal to the field winding, wherein the drive signal is an alternating current that alternates in accordance with an electrical angle;
    a pointer that points to a vehicle state value, which is indicated with a zero value as a reference thereof, in accordance with a rotational position of the pointer, and that is rotated in a zero-reset direction to return to a zero position that indicates the zero value;
    a reduction gear mechanism that includes a plurality of gears in engagement with each other, and that reduces a speed of rotation of the step motor and transmits the rotation of the step motor to the pointer thereby rotating the pointer;
    a stopper means for stopping the pointer, which is rotating in the zero-reset direction, at a stopper position that is located within a predetermined range from the zero position in the zero-reset direction;
    a detecting means for detecting an induced voltage generated in the field winding at each of a plurality of detecting points, which are electrical angles and include a zero point corresponding to the stopper position;
    a control means for controlling the drive signal applied to the field winding, wherein:
        an electrical angle, a phase of which is shifted from the zero point, is a waiting point;
        an electrical angle, a phase of which is shifted from the waiting point in a direction opposite from the zero point, is a return point;
        the control means performs zero-reset control, whereby the control means controls the drive signal so as to rotate the pointer from the waiting point in the zero-reset direction;
        the control means performs return control, whereby the control means controls the drive signal so as to rotate the pointer to the return point in an indication value increasing direction opposite from the zero-reset direction and then the control means controls the drive signal so as to return the pointer to the waiting point in the zero-reset direction thereby making the pointer stand by at the waiting point; and
        the control means carries out the return control prior to the zero-reset control; and
    an updating means for updating the zero point based on the induced voltage detected by the detecting means during the zero-reset control that is performed by the control means.

2. The indicating instrument according to claim 1, wherein a phase interval between the waiting point and the return point is equal to or larger than a phase interval between electrical angles that corresponds to an amount of backlashes between the plurality of gears of the reduction gear mechanism in engagement with each other.

3. The indicating instrument according to claim 2, wherein the phase interval between the waiting point and the return point is equal to the phase interval between electrical angles that corresponds to the amount of backlashes between the plurality of gears of the reduction gear mechanism in engagement with each other.

4. The indicating instrument according to claim 1, wherein:
    a phase interval between the waiting point and the zero point is a first phase interval;
    a phase interval between electrical angles that corresponds to an amount of backlashes between the plurality of gears of the reduction gear mechanism in engagement with each other is a second phase interval;
    a phase interval between a reference electrical angle corresponding to the zero position and the zero point is a third phase interval;
    when the third phase interval is smaller than a sum of the first phase interval and the second phase interval, the control means carries out the return control prior to the zero-reset control, wherein by the return control, the control means controls the drive signal so as to rotate the pointer from the reference electrical angle to the return point in the indication value increasing direction and then the control means controls the drive signal so as to return the pointer to the waiting point in the zero-reset direction, thereby making the pointer stand by at the waiting point; and
    when the third phase interval is equal to or larger than the sum of the first phase interval and the second phase interval, the control means carries out standby control instead of the return control, prior to the zero-reset control, wherein by the standby control, the control means controls the drive signal so as to rotate the pointer from the reference electrical angle directly to the waiting point in the zero-reset direction, thereby making the pointer stand by at the waiting point.

* * * * *